US007941490B1

(12) United States Patent
Cowings

(10) Patent No.: US 7,941,490 B1
(45) Date of Patent: May 10, 2011

(54) METHOD AND APPARATUS FOR DETECTING SPAM IN EMAIL MESSAGES AND EMAIL ATTACHMENTS

(75) Inventor: David O. Cowings, El Cerrito, CA (US)

(73) Assignee: Symantec Corporation, Mountain View, CA (US)

(*) Notice: Subject to any disclaimer, the term of this patent is extended or adjusted under 35 U.S.C. 154(b) by 1076 days.

(21) Appl. No.: 11/127,814

(22) Filed: May 11, 2005

Related U.S. Application Data

(60) Provisional application No. 60/570,168, filed on May 11, 2004.

(51) Int. Cl.
*G06F 15/16* (2006.01)
(52) U.S. Cl. ......... 709/206; 709/204; 709/205; 709/207
(58) Field of Classification Search ........... 709/204–207
See application file for complete search history.

(56) References Cited

U.S. PATENT DOCUMENTS

| | | | |
|---|---|---|---|
| 5,121,345 A | 6/1992 | Lentz | |
| 5,377,354 A | 12/1994 | Scannell et al. | |
| 5,438,433 A | 8/1995 | Reifman et al. | |
| 5,440,723 A | 8/1995 | Arnold et al. | |
| 5,537,540 A | 7/1996 | Miller et al. | |
| 5,557,789 A | 9/1996 | Mase et al. | |
| 5,619,648 A | 4/1997 | Canale et al. | |
| 5,634,005 A | 5/1997 | Matsuo | |
| 5,649,182 A | 7/1997 | Reitz | |
| 5,675,507 A | 10/1997 | Bobo, II | |
| 5,678,041 A | 10/1997 | Baker et al. | |
| 5,696,898 A | 12/1997 | Baker et al. | |
| 5,790,789 A | 8/1998 | Suarez | |
| 5,796,948 A | 8/1998 | Cohen | |
| 5,802,277 A | 9/1998 | Cowlard | |
| 5,809,242 A | 9/1998 | Shaw et al. | |
| 5,822,527 A | 10/1998 | Post | |
| 5,826,022 A | 10/1998 | Nielsen | |
| 5,835,087 A | 11/1998 | Herz et al. | |
| 5,845,263 A | 12/1998 | Camaisa et al. | |
| 5,862,325 A | 1/1999 | Reed et al. | |
| 5,864,684 A | 1/1999 | Neilsen | |
| 5,870,546 A | 2/1999 | Kirsch | |

(Continued)

FOREIGN PATENT DOCUMENTS

EP 0375138 6/1990

(Continued)

OTHER PUBLICATIONS

Clark et al., "PCMAIL: A Distributed Mail System for Personal Computers," May 1986, MIT Laboratory for Computer Science, 28 Pages (1-28).

(Continued)

*Primary Examiner* — Kevin Bates
*Assistant Examiner* — Marcus McKenzie
(74) *Attorney, Agent, or Firm* — Meyertons, Hood, Kivlin, Kowert & Goetzel, P.C.; Dean M. Munyon

(57) ABSTRACT

A method and system for a character-based document comparison are described. In one embodiment, the method includes receiving an email message and determining a level of noise present in the message. The level of noise present in the email message is then utilized to determine whether the message is indicative of spam.

23 Claims, 7 Drawing Sheets

U.S. PATENT DOCUMENTS

| | | | | |
|---|---|---|---|---|
| 5,870,548 | A | 2/1999 | Nielsen | |
| 5,874,955 | A | 2/1999 | Rogowitz et al. | |
| 5,884,033 | A | 3/1999 | Duvall et al. | |
| 5,889,943 | A | 3/1999 | Ji et al. | |
| 5,905,863 | A | 5/1999 | Knowles et al. | |
| 5,919,257 | A | 7/1999 | Trostle | |
| 5,930,479 | A | 7/1999 | Hall | |
| 5,956,481 | A | 9/1999 | Walsh et al. | |
| 5,968,117 | A | 10/1999 | Schuetze | |
| 5,978,837 | A | 11/1999 | Foladare et al. | |
| 5,999,932 | A | 12/1999 | Paul | |
| 5,999,967 | A | 12/1999 | Sundsted | |
| 6,023,700 | A | 2/2000 | Owens et al. | |
| 6,023,723 | A | 2/2000 | McCormick et al. | |
| 6,052,709 | A | 4/2000 | Paul | |
| 6,073,165 | A | 6/2000 | Narasimhan et al. | |
| 6,088,804 | A | 7/2000 | Hill et al. | |
| 6,112,227 | A | 8/2000 | Heiner | |
| 6,146,026 | A | 11/2000 | Ushiku | |
| 6,149,318 | A * | 11/2000 | Chase et al. | 717/131 |
| 6,157,630 | A | 12/2000 | Adler et al. | |
| 6,158,031 | A | 12/2000 | Mack et al. | |
| 6,158,045 | A * | 12/2000 | You | 717/124 |
| 6,161,130 | A | 12/2000 | Horvitz et al. | |
| 6,173,364 | B1 | 1/2001 | Zenchelsky et al. | |
| 6,182,118 | B1 | 1/2001 | Finney et al. | |
| 6,182,227 | B1 | 1/2001 | Blair et al. | |
| 6,189,026 | B1 | 2/2001 | Birrell et al. | |
| 6,195,686 | B1 | 2/2001 | Moon et al. | |
| 6,199,102 | B1 | 3/2001 | Cobb | |
| 6,216,165 | B1 | 4/2001 | Woltz et al. | |
| 6,226,630 | B1 | 5/2001 | Billmers | |
| 6,230,156 | B1 | 5/2001 | Hussey | |
| 6,266,774 | B1 | 7/2001 | Sampath et al. | |
| 6,272,641 | B1 | 8/2001 | Ji | |
| 6,314,454 | B1 | 11/2001 | Wang et al. | |
| 6,327,610 | B2 | 12/2001 | Uchida et al. | |
| 6,330,588 | B1 | 12/2001 | Freeman | |
| 6,334,140 | B1 | 12/2001 | Kawamata | |
| 6,360,254 | B1 | 3/2002 | Linden et al. | |
| 6,377,949 | B1 | 4/2002 | Gilmour | |
| 6,393,568 | B1 | 5/2002 | Ranger et al. | |
| 6,411,947 | B1 | 6/2002 | Rice et al. | |
| 6,421,709 | B1 * | 7/2002 | McCormick et al. | 709/206 |
| 6,438,125 | B1 | 8/2002 | Brothers | |
| 6,438,608 | B2 | 8/2002 | Biliris et al. | |
| 6,442,606 | B1 * | 8/2002 | Subbaroyan et al. | 709/224 |
| 6,466,966 | B1 | 10/2002 | Kirsch et al. | |
| 6,505,237 | B2 | 1/2003 | Beyda et al. | |
| 6,523,120 | B1 | 2/2003 | Strasnick | |
| 6,546,416 | B1 | 4/2003 | Kirsch | |
| 6,549,957 | B1 | 4/2003 | Hanson et al. | |
| 6,571,275 | B1 | 5/2003 | Dong et al. | |
| 6,654,787 | B1 | 11/2003 | Aronson et al. | |
| 6,671,812 | B1 | 12/2003 | Balasubramaniam et al. | |
| 6,718,321 | B2 | 4/2004 | Birrell et al. | |
| 6,732,157 | B1 | 5/2004 | Gordon et al. | |
| 6,757,713 | B1 * | 6/2004 | Ogilvie et al. | 709/206 |
| 6,785,732 | B1 | 8/2004 | Bates et al. | |
| 6,792,543 | B2 | 9/2004 | Pak et al. | |
| 6,836,272 | B2 | 12/2004 | Leung et al. | |
| 6,859,833 | B2 | 2/2005 | Kirsch et al. | |
| 7,010,698 | B2 | 3/2006 | Sheymov | |
| 7,072,944 | B2 | 7/2006 | Lalonde et al. | |
| 7,093,121 | B2 | 8/2006 | Barton et al. | |
| 7,096,500 | B2 | 8/2006 | Roberts et al. | |
| 7,107,406 | B2 * | 9/2006 | Kurasugi | 711/137 |
| 7,114,177 | B2 | 9/2006 | Rosenberg et al. | |
| 7,249,175 | B1 * | 7/2007 | Donaldson | 709/225 |
| 7,272,853 | B2 * | 9/2007 | Goodman et al. | 726/13 |
| 7,315,893 | B2 | 1/2008 | Vinberg | |
| 7,331,062 | B2 | 2/2008 | Alagna et al. | |
| 7,392,294 | B2 * | 6/2008 | Hellstrom | 709/217 |
| 7,395,657 | B2 | 7/2008 | Johnson | |
| 7,398,315 | B2 * | 7/2008 | Atkinson et al. | 709/227 |
| 7,451,487 | B2 * | 11/2008 | Oliver et al. | 726/24 |
| 7,472,163 | B1 * | 12/2008 | Ben-Yoseph et al. | 709/206 |
| 7,500,265 | B2 * | 3/2009 | Encinas et al. | 726/22 |
| 7,644,127 | B2 * | 1/2010 | Yu | 709/206 |
| 7,870,203 | B2 * | 1/2011 | Judge et al. | 709/206 |
| 2001/0042240 | A1 * | 11/2001 | Ng et al. | 717/3 |
| 2001/0049620 | A1 * | 12/2001 | Blasko | 705/10 |
| 2002/0007301 | A1 | 1/2002 | Reuning | |
| 2002/0046065 | A1 | 4/2002 | Nighan | |
| 2002/0116635 | A1 | 8/2002 | Sheymov | |
| 2002/0147780 | A1 | 10/2002 | Liu et al. | |
| 2002/0150243 | A1 | 10/2002 | Craft et al. | |
| 2002/0174137 | A1 | 11/2002 | Wolff et al. | |
| 2002/0199120 | A1 * | 12/2002 | Schmidt | 713/201 |
| 2003/0023722 | A1 | 1/2003 | Vinberg | |
| 2003/0033536 | A1 | 2/2003 | Pak et al. | |
| 2003/0041126 | A1 * | 2/2003 | Buford et al. | 709/220 |
| 2003/0097451 | A1 | 5/2003 | Bjorksten et al. | |
| 2003/0159070 | A1 | 8/2003 | Mayer et al. | |
| 2003/0174137 | A1 | 9/2003 | Leung et al. | |
| 2004/0054917 | A1 | 3/2004 | Obrecht et al. | |
| 2004/0064736 | A1 | 4/2004 | Obrecht et al. | |
| 2004/0073617 | A1 * | 4/2004 | Milliken et al. | 709/206 |
| 2004/0078422 | A1 * | 4/2004 | Toomey | 709/202 |
| 2004/0088570 | A1 | 5/2004 | Roberts et al. | |
| 2004/0098607 | A1 | 5/2004 | Alagna et al. | |
| 2004/0122976 | A1 * | 6/2004 | Dutta et al. | 709/245 |
| 2004/0123157 | A1 | 6/2004 | Alagna et al. | |
| 2004/0128355 | A1 * | 7/2004 | Chao et al. | 709/206 |
| 2004/0177120 | A1 | 9/2004 | Kirsch et al. | |
| 2004/0181585 | A1 * | 9/2004 | Atkinson et al. | 709/206 |
| 2004/0187023 | A1 | 9/2004 | Alagna et al. | |
| 2004/0221062 | A1 * | 11/2004 | Starbuck et al. | 709/246 |
| 2004/0230820 | A1 | 11/2004 | Hsu et al. | |
| 2005/0015454 | A1 * | 1/2005 | Goodman et al. | 709/207 |
| 2005/0041789 | A1 * | 2/2005 | Warren-Smith et al. | 379/93.24 |
| 2005/0050222 | A1 | 3/2005 | Packer | |
| 2005/0060643 | A1 * | 3/2005 | Glass et al. | 715/501.1 |
| 2005/0081059 | A1 | 4/2005 | Bandini et al. | |
| 2005/0108339 | A1 * | 5/2005 | Gleeson et al. | 709/206 |
| 2005/0108340 | A1 * | 5/2005 | Gleeson et al. | 709/206 |
| 2005/0137832 | A1 | 6/2005 | Bullock et al. | |
| 2005/0149726 | A1 * | 7/2005 | Joshi et al. | 713/164 |
| 2005/0256930 | A1 * | 11/2005 | Pearson et al. | 709/206 |
| 2005/0262209 | A1 * | 11/2005 | Yu | 709/206 |
| 2006/0015561 | A1 * | 1/2006 | Murphy et al. | 709/206 |
| 2006/0020693 | A1 * | 1/2006 | Hellstrom | 709/223 |
| 2006/0031298 | A1 | 2/2006 | Hasegawa | |
| 2006/0036693 | A1 * | 2/2006 | Hulten et al. | 709/206 |
| 2006/0053490 | A1 * | 3/2006 | Herz et al. | 726/23 |
| 2006/0168005 | A1 * | 7/2006 | Shannon et al. | 709/206 |
| 2006/0251068 | A1 | 11/2006 | Judge et al. | |
| 2006/0288076 | A1 | 12/2006 | Cowings et al. | |
| 2007/0118904 | A1 * | 5/2007 | Goodman et al. | 726/22 |
| 2007/0143432 | A1 | 6/2007 | Klos et al. | |

FOREIGN PATENT DOCUMENTS

| | | |
|---|---|---|
| EP | 0420779 | 4/1991 |
| EP | 0720333 | 7/1996 |
| GB | 2271002 | 3/1994 |
| JP | 10240649 | 11/1998 |
| WO | 9635994 | 11/1996 |
| WO | 9837680 | 8/1998 |
| WO | 0203178 | 1/2002 |
| WO | 02103533 | 12/2002 |
| WO | 2004021197 | 3/2004 |
| WO | 2004055632 | 7/2004 |
| WO | 2004072777 | 8/2004 |

OTHER PUBLICATIONS

U.S. Appl. No. 10/117,065, entitled "Apparatus and Method for Weighted and Aging Spam Filtering Rules," by Sunil Paul, et al., filed Apr. 4, 2002.

U.S. Appl. No. 10/871,583, entitled "System and Method for Filtering Spam Messages Utilizing URL Filtering Module," by Cowings, et al., filed Jun. 17, 2004.

U.S. Appl. No. 10/949,465, entitled "System and Method for Filtering Fraudulent Email Messages," by Bruno, et al., filed Sep. 24, 2004.

U.S. Appl. No. 11/048,958, entitled "Method and Apparatus For Determining the Source of an Email Message," by Mantel, filed Feb. 1, 2005.

U.S. Appl. No. 11/157,327, entitled "Method and Apparatus for Grouping Spam Email Messages," by Jensen, filed Jun. 20, 2005.

U.S. Appl. No. 11/127,813, entitled "Method and Apparatus for Simulating End User Responses to Spam Email Messages," by Khalsa, et al., filed May 11, 2005.

U.S. Appl. No. 11/116,572, entitled "Method and Apparatus For Creating Aggressive Anti-Spam Rules," by Chin, et al., filed Apr. 27, 2005.

Harker, R., "Selectively Rejecting SPAM Using Sendmail," Proceedings of the Eleventh Systems Administration Conference, abstract only, Oct. 1997.

Gaskin, J.E., "Don't Get Spammed," Information Week, Aug. 18, 1997, retrieved from Internet: http://www.informationweek.com/644/44olspm.htm, 9 pages.

Ranum, M.J. et al., "Implementing a Generalized Tool for Network Monitoring," Proceedings of the Eleventh Systems Administration Conference (LISA XI), San Diego, CA, Oct. 26-31, 1997, pp. 1-8.

Kaufman, et al., "Network Security: Private Communication in a Public World—Revocation—Section 15.4," 2nd Edition, Prentice Hall Series in Computer Networking and Distributed Systems, 2002, 4 pages.

* cited by examiner

METHOD AND APPARATUS FOR DETECTING SPAM IN EMAIL MESSAGES AND EMAIL ATTACHMENTS

RELATED APPLICATIONS

The present application claims priority to U.S. Provisional Application Ser. No. 60/570,168 filed May 11, 2004, which is incorporated herein in its entirety.

FIELD OF THE INVENTION

The present invention relates to data processing; more particularly, the present invention relates to detecting spam in email messages and email attachments.

BACKGROUND OF THE INVENTION

Spam, an electronic version of junk mail, is unsolicited email on the Internet. A filter, on the other hand, is a piece of software that is capable of identifying an email message as spam and blocking or redirecting delivery of a spam message. Some existing methods for generating spam filters rely on collecting spam email messages, processing the messages, and creating filtering rules to be later used to detect spam email.

Presently, there are products that are capable of filtering out unwanted messages. For example, a spam block method exists which keeps an index list of all spam agents (i.e., companies that generate mass unsolicited e-mails), and provides means to block any e-mail sent from a company on the list.

Another "junk mail" filter currently available employs filters that are based on predefined words and patterns as mentioned above. An incoming mail is designated as an unwanted mail, if the subject contains a known spam pattern.

However, as spam filtering grows in sophistication, so do the techniques of spammers in avoiding the filters. Examples of tactics incorporated by recent generation of spammers include randomization, origin concealment, and filter evasion using HTML.

SUMMARY OF THE INVENTION

A method and system for detecting spam in email messages and email attachments are described. According to one aspect, the method includes receiving an email message and determining a level of noise present in the message. The level of noise present in the email message is then utilized to determine whether the message is indicative of spam.

Other features of the present invention will be apparent from the accompanying drawings and from the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for detecting spam in email messages and email attachments are described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

In one embodiment, the inventive method takes advantage of the fact that spammers often use various obfuscation techniques to generate a spam message. Some legitimate email messages may have some level of "noise" or "demangling" in order to hide the recipient's personal information that may be present in the body of an email. An assumption may be made, however, that increased level of noise indicates a higher probability that the message is spam. With this assumption in mind, a filtering module may be provided including a noise tracking filter, as well as various signature based and other filters. As an email message is being examined by each of the filters, it accumulates a total "spam weight" value associated with the likelihood of the message being spam. In one embodiment, a weight value generated by the noise tracking filter may be 'low' for messages that exhibit one or two demangling steps, 'medium' for messages that exhibit three to five demangling steps, and 'high' for messages that exhibit six or more demangling steps. The sum of all weight values generated by the filters may be then compared to a predetermined threshold value and, if the threshold is reached, the message is blocked or redirected as spam. Otherwise, the message is allowed to proceed to the user's mailbox.

In one embodiment, the filters utilized to determine whether a message is indicative of spam comprise filters targeting embedded attachments such as mime attachments. A filtering module may be configured to filter a targeted mime attachment even where the associated mime header has been obfuscated. For example, the filtering module may be configured to recognize an audio attachment even if the name of the associated attachment has a misleading extension string such as ".exe."

Such filters targeting embedded mime attachments may be generated, for example, by examining attachments indicative of spam, grouping attachments having similar spam-indicative characteristics, and generating filters for attachments with such spam-indicative characteristics.

Figure 1:
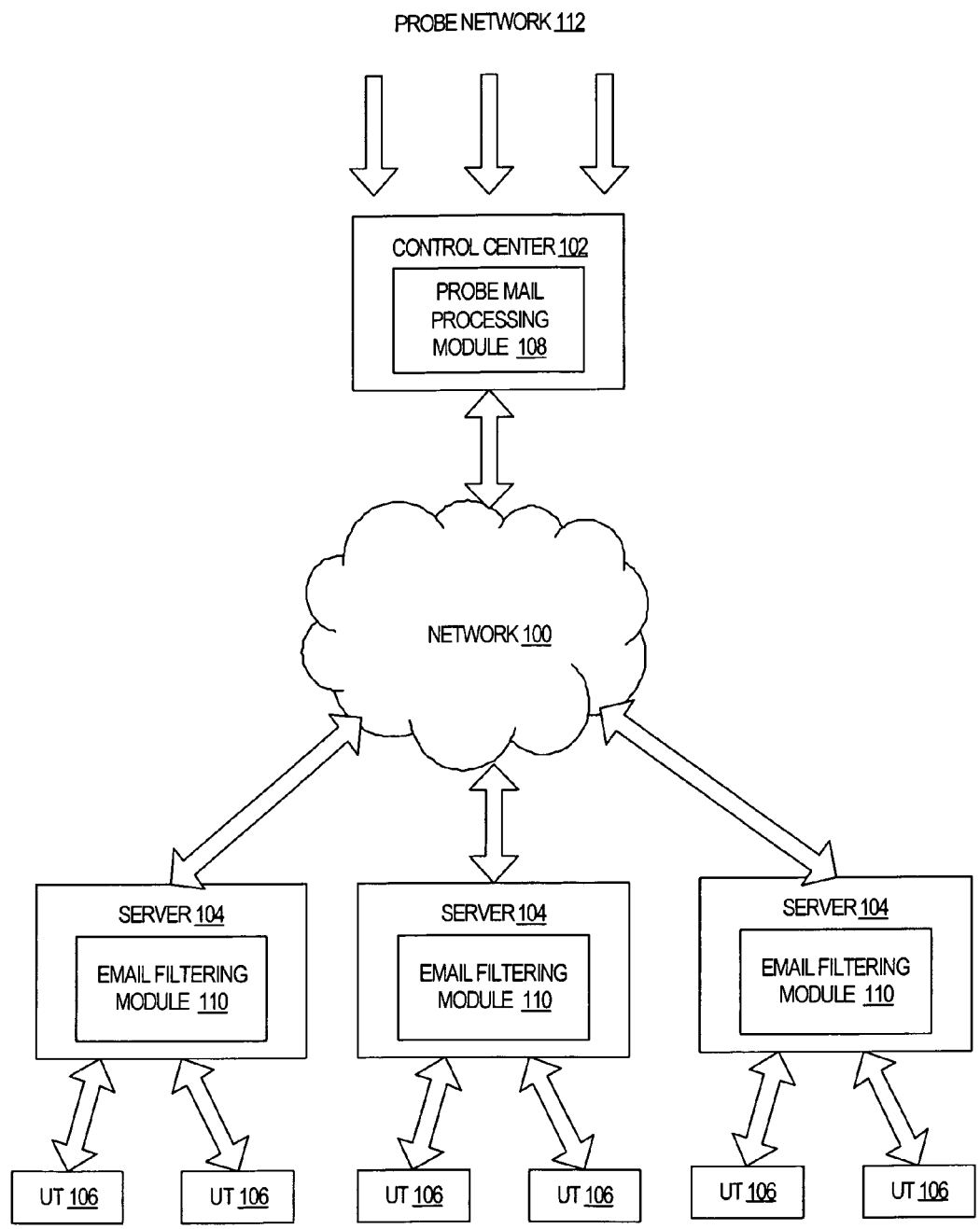
FIG. 1 is a block diagram of one embodiment of a system for controlling delivery of spam electronic mail.

FIG. 1 is a block diagram of one embodiment of a system for controlling delivery of spam electronic mail (email). The system includes a control center 102 coupled to a communications network 100 such as a public network (e.g., the Internet, a wireless network, etc.) or a private network (e.g., LAN, Intranet, etc.). The control center 102 communicates with multiple network servers 104 via the network 100. Each server 104 communicates with user terminals 106 using a private or public network.

The control center 102 is an anti-spam facility that is responsible for analyzing messages indicative of spam, developing filtering rules for detecting spam, and distributing the filtering rules to the servers 104. A message may be indicative of spam because it was collected via a "probe network" 112. In one embodiment, the probe network is formed by fictitious probe email addresses specifically selected to make their way into as many spammer mailing lists as possible. The fictitious probe email addresses may also be selected to appear high up on spammers' lists in order to receive spam mailings early in the mailing process (e.g., using the e-mail address "aardvark@aol.com" ensures relatively high placement on an alphabetical mailing list). The fictitious probe email addresses may include, for example, decoy accounts and expired domains. In addition, a certain percentage of assignable e-mail addresses offered by an ISP or private network may be reserved for use as probe email addresses. The probe network 112 may also receive email identified as spam by users of terminals 106.

A server 104 may be a mail server that receives and stores messages addressed to users of corresponding user terminals. Alternatively, a server 104 may be a different server (e.g., a gateway of an Internet Service Provider (ISP)) coupled to a mail server. Servers 104 are responsible for filtering incoming messages based on the filtering rules received from the control center 102. Servers 104 operate as clients receiving services of the control center 102.

In one embodiment, the control center 102 includes a probe mail processing module 108 that is responsible for identifying spam email messages resulted from distinct spam attacks, generating filters for the distinct spam attacks, and distributing the filters to the servers 104 for detection of spam email resulted from these spam attacks at the customer sites.

Each server 104 includes an email filtering module 110 that is responsible for storing filters received from the control center 102 and detecting spam email using these filters.

In an alternative embodiment, each server 104 hosts both the probe mail processing module 108 that generates spam filters and the email filtering module 110 that uses the generated filters to detect spam email.

Figure 2:
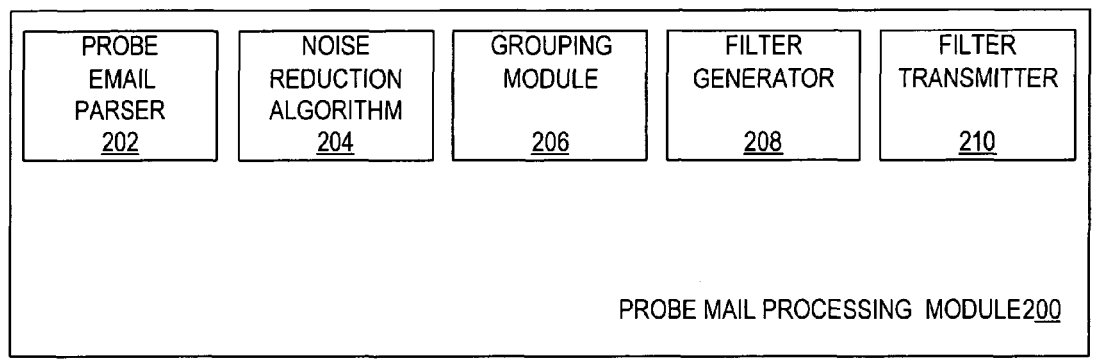
FIG. 2 is a block diagram of one embodiment of a probe mail processing module.

FIG. 2 is a block diagram of one embodiment of a probe mail processing module 200. The probe mail processing module 200 includes a probe email parser 202, a noise reduction algorithm 204, a grouping module 206, a filter generator 208 and a filter transmitter 210.

The probe email parser 202 is responsible for parsing the body of probe email messages.

The noise reduction algorithm 204 is responsible for detecting data indicative of noise and removing noise from probe email messages. Noise represents data invisible to a recipient that was added to an email message to hide its spam nature. Such data may include, for example, formatting data (e.g., HTML tags), numeric character references, character entity references, URL data of predefined categories, etc. Numeric character references specify the code position of a character in the document character set. Character entity references use symbolic names so that authors need not remember code positions. For example, the character entity reference "å" refers to the lowercase "a" character topped with a ring. Predefined categories of URL data may include, for example, numerical character references contained in the URL and the URL "password" syntax data that adds characters before an "@" in the URL hostname.

In one embodiment, the noise reduction algorithm 204 removes noise associated with characteristics of email attachments. For example, spam messages may contain attachments that are the same but have different file names or different file types to hide the spam nature of these messages. The noise reduction algorithm 204 may remove noise intentionally added to the characteristics of attachments such as attachment file names and file types.

The grouping module 206 is responsible for grouping probe email messages that are likely to result from distinct spam attacks. In one embodiment, spam messages that contain common embedded attachments may be grouped together as indicative of a distinct spam attack even where such common attachments are identified by different names. The grouping module 206 may compare embedded attachments using regular expressions or mathematical signatures of attachments. Mathematical signatures of attachments may consist of checksums, hash values or some other data identifying the attachment content, and may be created using various algorithms that enable the use of similarity measures in comparing different attachments.

The filter generator 208 is responsible for generating filters for individual groups created by the grouping module 206. A filter may include a mathematical signature of a probe email message, a regular expression characterizing a probe email message, one or more URLs extracted from a probe email message, a mathematical signature of an email attachment, a regular expression characterizing an email attachment, or any other data characterizing probe email messages resulted from a spam attack.

In one embodiment, a mathematical signature may include a list of hash values calculated for sets of tokens (e.g., characters, words, lines, etc.) characterizing a spam message in general or a particular component of a spam message, such as an embedded mime attachment. Data characterizing a spam message or any other email message is referred to herein as a message signature. Data characterizing an email attachment is referred to herein as an attachment signature. In one embodiment, an attachment signature characterizes solely the content of a relevant attachment, without any regard to the attachment's properties such as the attachment's file name and file type.

Signatures of email messages and attachments may be created using various algorithms that enable the use of similarity measures in comparing signatures of different email messages and email attachments.

The filter generator 208 may be configured to generate signatures for attachments such as mime (multipurpose internal mail extensions) attachments. Mime attachments may include, for example, text/plain attachments, image/gif attachments, image/jpeg attachments, application/octet-stream attachments, application/x-msdownload attachments, audio/x-wav attachments, multipart/alternative attachments, multipart/related attachments, etc.

The filter transmitter 210 is responsible for distributing filters to participating servers such as servers 104 of FIG. 1. In one embodiment, each server 104 periodically (e.g., each 5 minutes) initiates a connection (e.g., a secure HTTPS connection) with the call center 102. Using this pull-based connection, filters are transmitted from the call center 102 to the relevant server 104 for detection of spam email at relevant customer sites.

Figure 3:
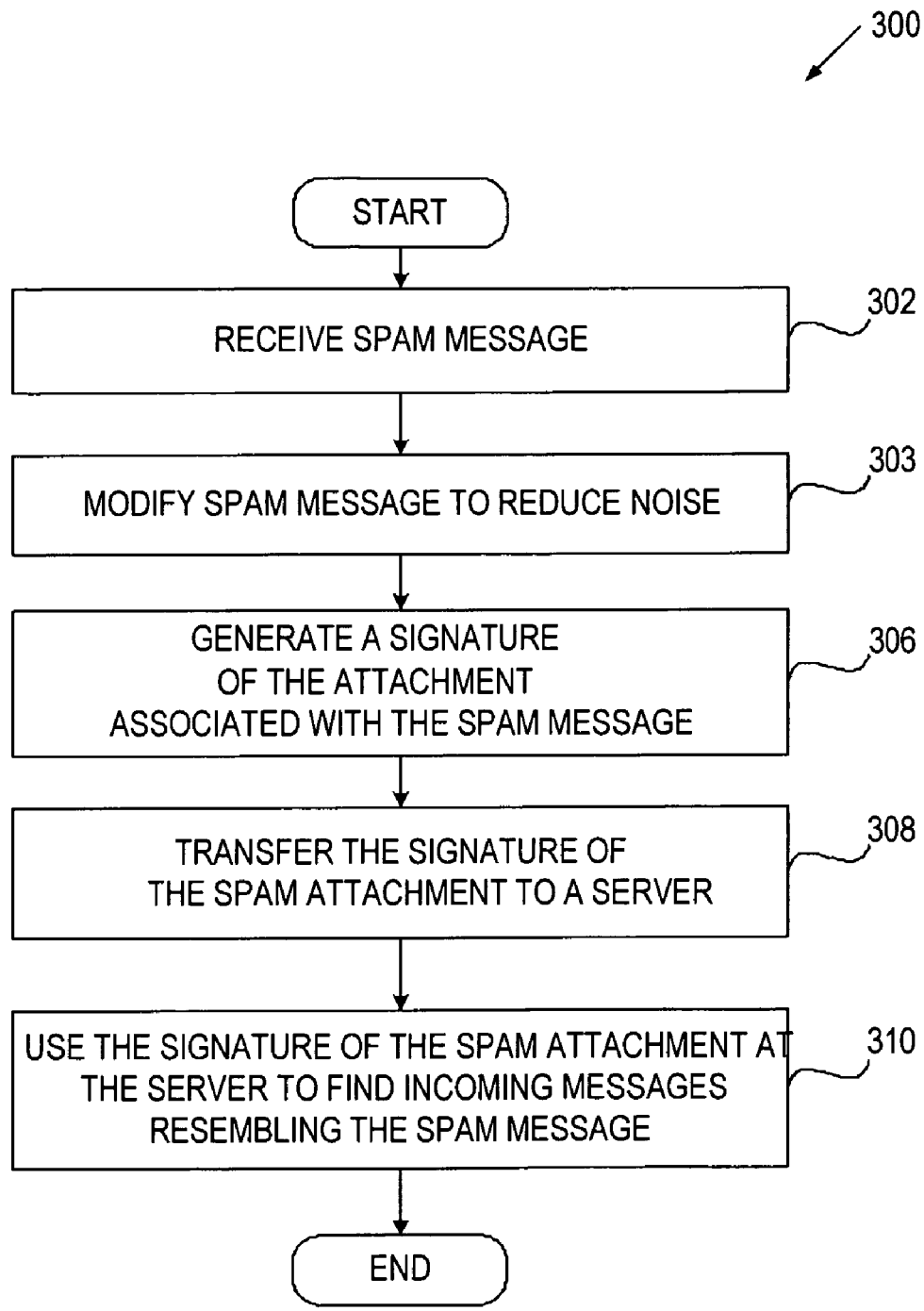
FIG. 3 is a flow diagram of one embodiment of a process for generating an attachment filter.

FIG. 3 is a flow diagram of one embodiment of a process 300 for generating an attachment filter. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a control center 102 of FIG. 1.

Referring to FIG. 3, process 300 begins with processing logic receiving a spam message that includes an attachment (processing block 302). An attachment may be, for example, a text file, an audio file, an image, an application, etc.

At processing block 304, processing logic modifies the spam message to reduce noise. At processing block 306, processing logic generates a signature of the attachment. In one embodiment, the processing logic is capable of determining a type of the attachment even if the mime-header associated with the attachment is attempting to obfuscate the nature of the attachment. For example, an audio attachment may be identified as "gzyjc.exe" in the mime-header.

At processing block 308, processing logic transfers the signature of the attachment to a server (e.g., a server 104 of FIG. 1), which uses the signature of the attachment to find incoming email messages with similar attachments (block 310).

Figure 4:
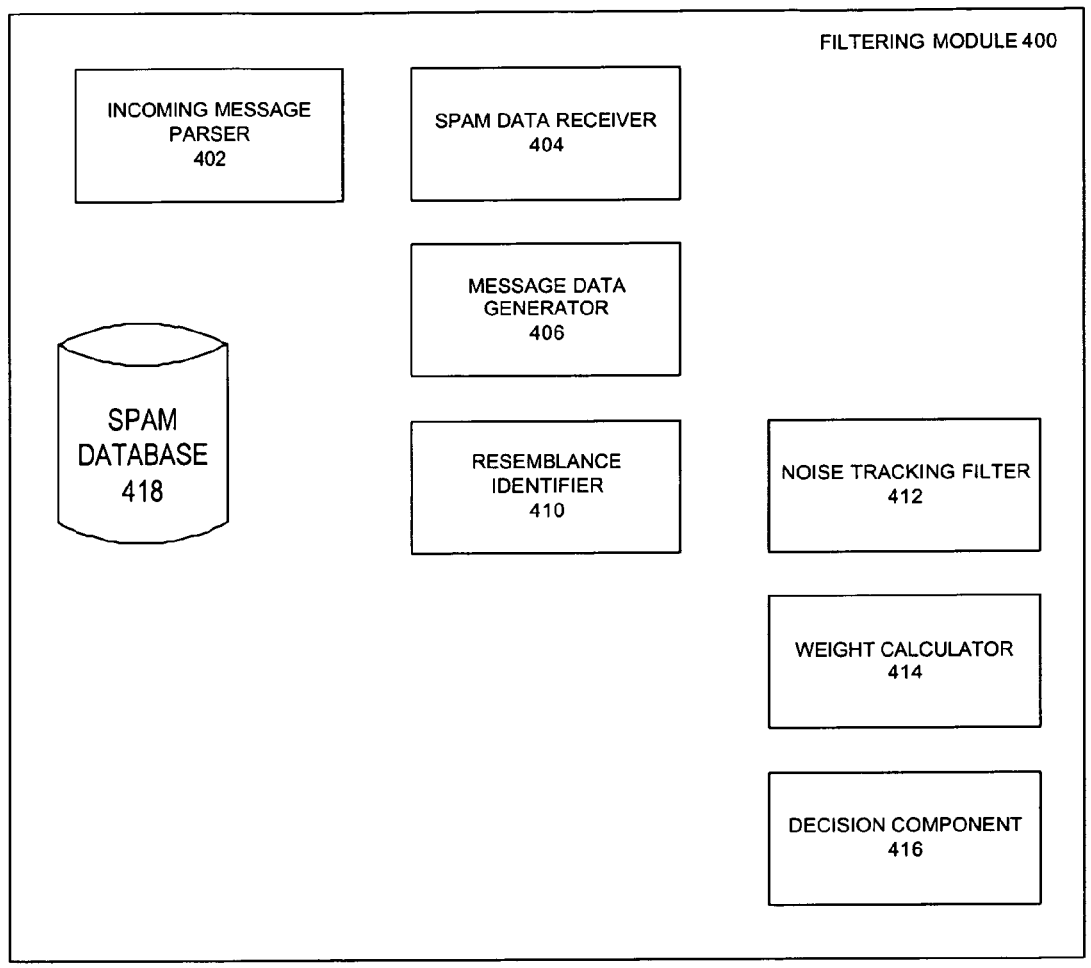
FIG. 4 is a block diagram of one embodiment of a filtering module.

FIG. 4 is a block diagram of one embodiment of a filtering module 400. The filtering module 400, in one embodiment, includes an incoming message parser 402, a spam data receiver 404, a message data generator 406, a resemblance identifier 410, a noise tracking filter 412, a spam weight calculator 414, a decision component 416, and a spam database 418.

The incoming message parser 402 is responsible for parsing the body of incoming email messages.

The spam data receiver 404 is responsible for receiving filters (e.g., signatures of spam messages and attachments, URLs indicative of spam, etc.) and storing them in the spam database 418.

The message data generator 406 is responsible for generating signatures of incoming email messages, including attachment-specific message signatures.

In one embodiment, the filtering module 400 utilizes an incoming message cleaning algorithm for detecting data indicative of noise and removing the noise from the incoming email messages prior to generating their signatures.

The resemblance identifier 410 is responsible for comparing the signature of each incoming email message with the signatures of anti-spam filters stored in the spam database 418 and determining, based on this comparison, whether an incoming email message is similar to any spam message. In one embodiment, the resemblance identifier 410 compares the signature of an attachment embedded in an incoming email message with attachment signatures of anti-spam filters stored in the spam database 418.

In one embodiment, the spam database 418 stores signatures generated for spam messages before they undergo the noise reduction process (i.e., noisy spam messages) and signatures generated for these spam messages after they undergo the noise reduction process (i.e., spam message with reduced noise). In this embodiment, the message data generator 406 first generates a signature of an incoming email message prior to noise reduction, and the resemblance identifier 410 compares this signature with the signatures of noisy spam messages. If this comparison indicates that the incoming email message is similar to one of these spam messages, then the resemblance identifier 410 marks this incoming email message as spam. Alternatively, the resemblance identifier 410 invokes the incoming message cleaning algorithm to remove noise from the incoming email message. Then, the message data generator 406 generates a signature for the modified incoming message, which is then compared by the resemblance identifier 418 with the signatures of spam messages with reduced noise.

In one embodiment, the resemblance identifier 410 may be configured to generate for an incoming email message a so called spam weight based on the results of the comparison of the signature of the incoming email message or its attachment with the signatures of spam messages or attachments stored in the spam database 418. The spam weight may be utilized to determine whether the incoming email message is spam.

In one embodiment, the noise tracking filter 412 may be utilized to determine a level of obfuscation, or noise, associated with an incoming message, and to generate a spam weight value based on the determined level of noise. The level of noise may be based on the number of obfuscating techniques present in the message. This spam weight value may then be utilized, along with a spam weight value generated by the resemblance identifier 410 to determine whether the incoming email message is spam. The spam weight calculator 414 may receive the spam weight values for a message and calculate a total spam weight, which, in turn, may be compared with a predetermined threshold value by the decision component 416 in order to determine whether to block the message as spam or allow the message to proceed to the user's inbox.

Figure 5:
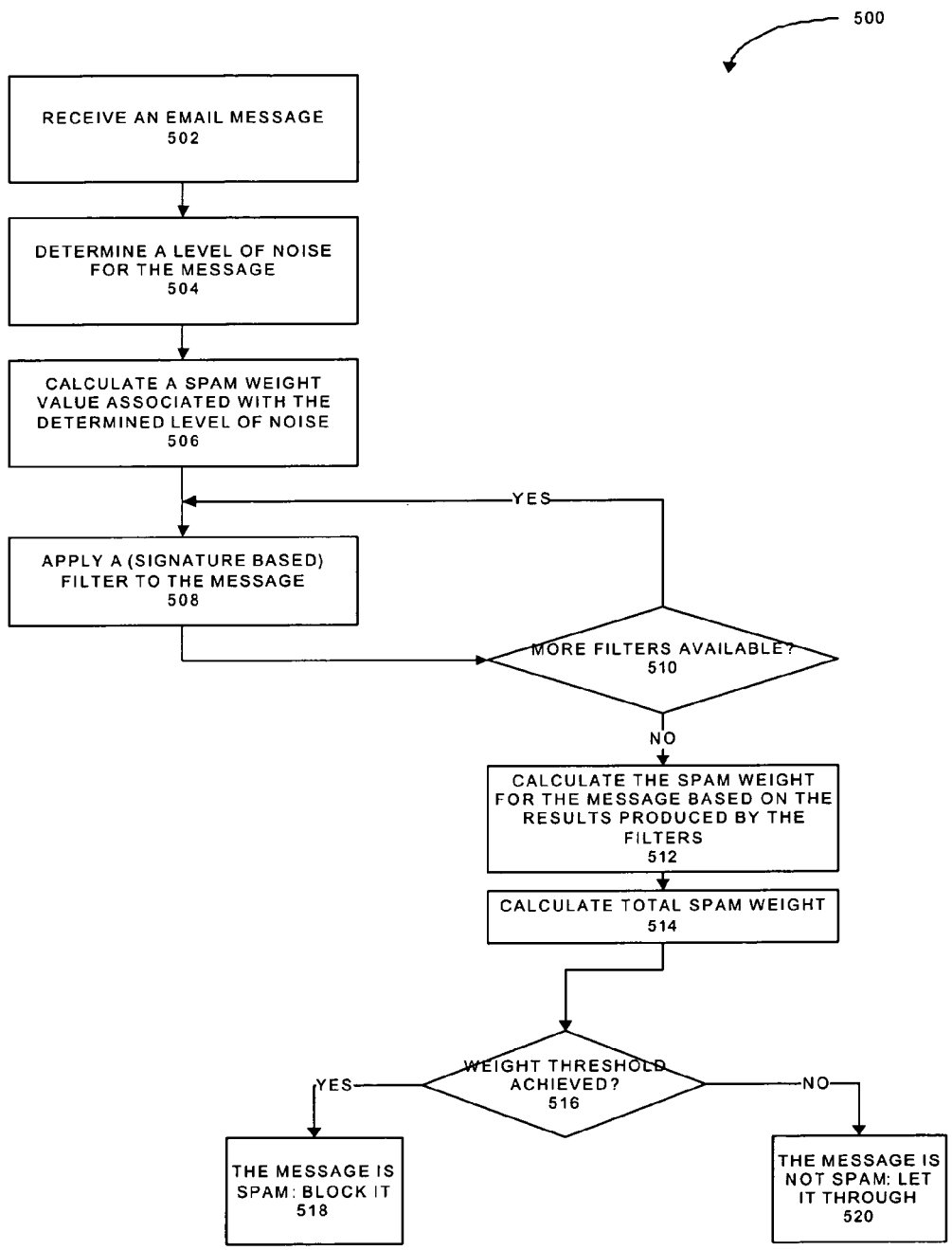
FIG. 5 is a flow diagram of one embodiment of a process for determining whether an email message is spam.

FIG. 5 is a flow diagram of one embodiment of a process 500 for determining whether an incoming email message is a spam message. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a server 104 of FIG. 1.

Referring to FIG. 5, process 500 begins with processing logic receiving an email message (processing block 502).

At processing block 504, the noise tracking filter 412 determines the noise level associated with the message and calculates an associated spam weight value at processing block 506. In one embodiment, a weight value generated by the noise tracking filter 412 may be 'low' for messages that exhibit one or two noise reduction (demangling) steps, 'medium' for messages that exhibit three to five demangling steps, and 'high' for messages that exhibit six or more demangling steps.

The processing logic applies signature based filters to the message, e.g., utilizing the spam database 418 and the resemblance identifier 410 (processing blocks 508 and 510) and generates the spam weight value based on the results generated by the signature based filters (processing block 512). At processing block 514, the spam weight calculator 414 calculates total spam weight for the message based on the spam value generated by the noise tracking filter 412 and the spam weight value based on the results of the signature based filters. The total spam value is compared to a predetermined threshold value at processing block 516. Based on this comparison, the message is either blocked or redirected to, e.g., a "bulk" folder (processing block 518), or allowed to proceed to, e.g., the user's inbox (processing block 520).

It will be noted, that signature based filters may includes filters that specifically target attachments that have been determined to be indicative of spam. Such filters may be referred to as attachment filters.

Figure 6:
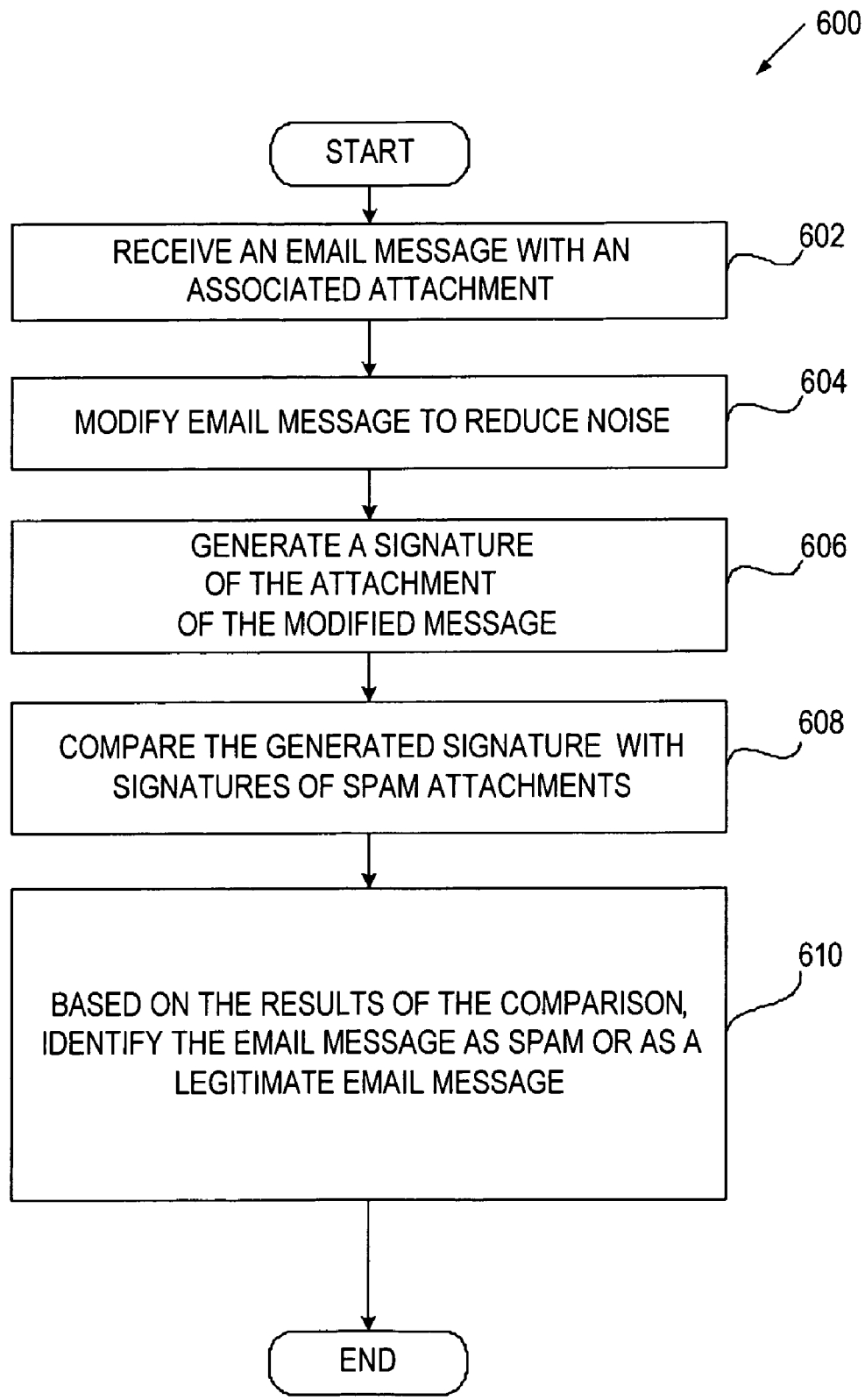
FIG. 6 is a flow diagram of one embodiment of a process for utilizing one or more attachment filters to determine whether an email message is spam.

FIG. 6 is a flow diagram of one embodiment of a process 600 for utilizing one or more attachment filters to determine whether an email message is spam. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a server 104 of FIG. 1.

Referring to FIG. 6, process 600 begins with processing logic receiving an incoming email message comprising an attachment (processing block 602). At processing block 604, processing logic modifies the incoming message to reduce noise.

At processing block 606, processing logic generates a signature of the attachment of the modified message. At processing block 608, processing compares the signature of the attachment associated with the incoming email message with signatures of attachments associated with spam messages (signatures of spam attachments). Filters that are targeting mime attachments may be referred to as mime-attachment signature filters.

In one embodiment, processing logic identifies the type of the attachment associated with the incoming email message and then compares the signature of the attachment embedded in the incoming email message with signatures of spam attachments of the same type. If no match is found, processing logic compares the signature of the attachment embedded in the incoming email message with signatures of spam attachments of different types. Alternatively, processing logic may identify an indication of obfuscation associated with the attachment (e.g., by determining that the name associated with the attachment is inconsistent with the type of the attachment) and disregard the type of the attachment embedded in the incoming message when comparing this attachment with signatures of spam attachments.

At processing block 610, processing logic determines whether the email message is spam or a legitimate email message based on the degree of similarity between the signature of the message and the signatures of the spam attachments.

In one embodiment, the process 600 is capable of identifying a mime-attachment signature filter appropriate for a particular kind of attachment found in an incoming email message even where the mime-header of the attachment found in an incoming email is attempting to obfuscate the attachment.

Figure 7:
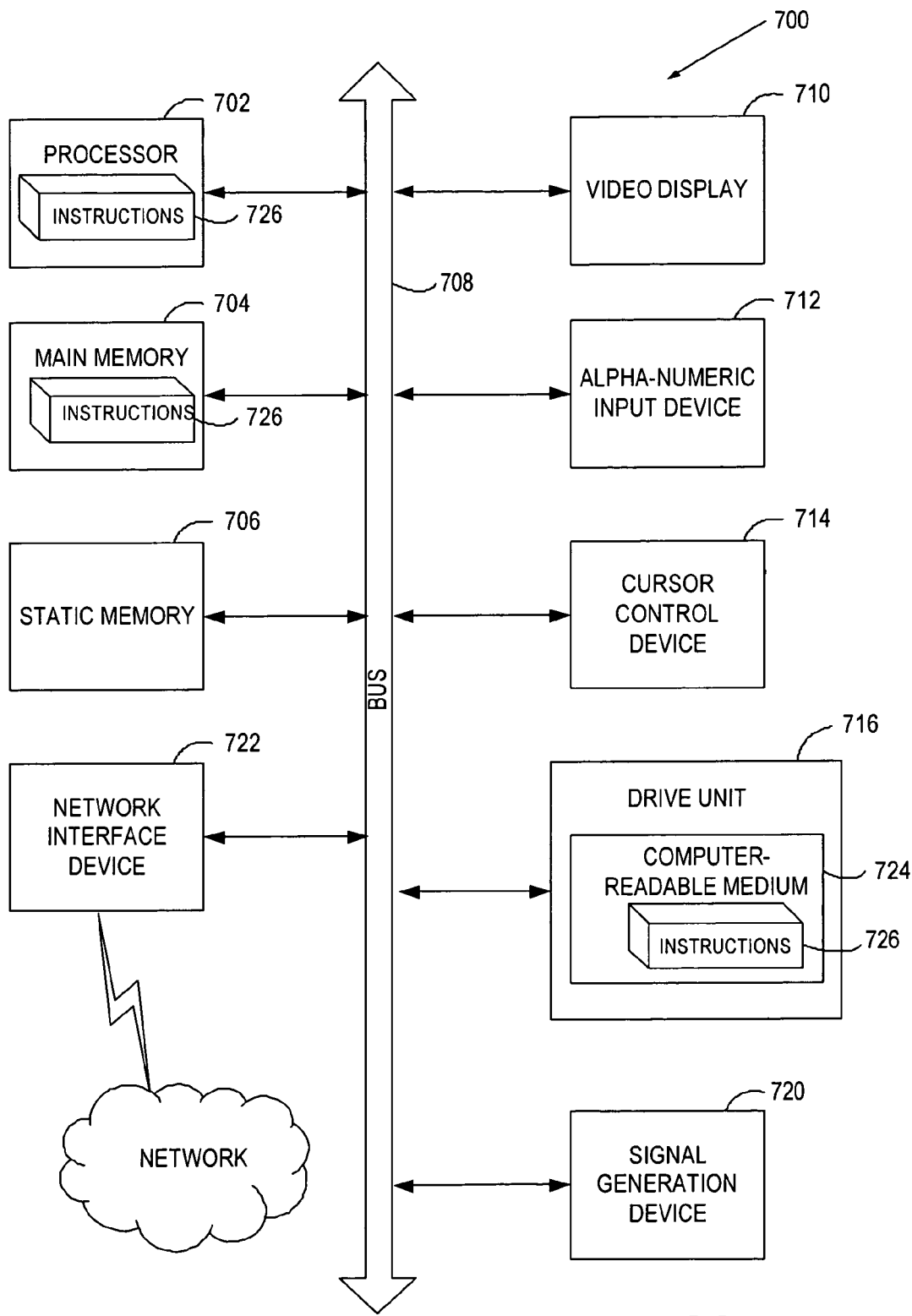
FIG. 7 is a block diagram of an exemplary computer system.

FIG. 7 is a block diagram of an exemplary computer system 700 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 700 includes a processor 702, a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alpha-numeric input device 712 (e.g., a keyboard), a cursor control device 714 (e.g., a mouse), a disk drive unit 716, a signal generation device 720 (e.g., a speaker) and a network interface device 722.

The disk drive unit 716 includes a computer-readable medium 724 on which is stored a set of instructions (i.e., software) 726 embodying any one, or all, of the methodologies described above. The software 726 is also shown to reside, completely or at least partially, within the main memory 704 and/or within the processor 702. The software 726 may further be transmitted or received via the network interface device 722. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, method and apparatus for simulating end user responses to spam email messages have been described. In the following description, numerous details have been set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the foregoing detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method comprising:
    a computer system receiving an email message;
    the computer system performing a plurality of demangling operations on the received email message, wherein each demangling operation identifies a different type of obfuscation technique, and wherein said performing includes modifying content of the received email message;
    the computer system counting a number of the performed plurality of demangling operations that indicate a presence of noise in the received email message; and
    the computer system utilizing the counted number of demangling operations to determine whether the email message is indicative of spam.

2. The method of claim 1 wherein performing a first of the plurality of demangling operations on the received email message includes:
    identifying, in the received email message, a first set of data indicative of a first type of obfuscation technique; and
    responsive to the identifying, modifying the email message.

3. The method of claim 1 wherein performing one of the plurality of demangling operations includes: identifying, in the email message, one or more numeric character references or character entity references indicative of a first type of obfuscation technique; and
    responsive to the identifying, modifying at least one of the identified references.

4. The method of claim 3 wherein performing one of the plurality of demangling operations includes:
    identifying, in the email message, URL password syntax data indicative of a second type of obfuscation technique; and
    responsive to the identifying, modifying the identified URL password syntax data.

5. The method of claim 1 wherein performing one of the plurality of demangling operations includes:
    identifying HTML formatting data in the email message; and
    responsive to the identifying, removing the identified HTML formatting data from the email message.

6. The method of claim 1 further comprising the computer system blocking the email message if the email message is determined to be spam.

7. The method of claim 1 wherein performing one of the plurality of demangling operations includes:
    identifying noise in a header of an attachment of the email message; and
    responsive to the identifying, removing the identified noise from the header.

8. The method of claim 7 wherein the identifying includes utilizing a mathematical signature associated with a type of the attachment.

9. The method of claim 7 wherein the identified noise is identified in a file extension associated with the attachment.

10. A computer system comprising:
    a processor;
    a memory storing program instructions executable by the processor to:
        receive an email message;
        perform a plurality of demangling operations on the received email message, including modifying content of the received email message, wherein each demangling operation identifies a different type of obfuscation technique;
        count a number of the performed plurality of demangling operations that indicate a presence of noise in the received email message; and
        utilize the counted number of demangling operations to determine whether the email message is indicative of spam.

11. A non-transitory computer readable storage medium storing program instructions that are executable to:
    receive an email message;
    perform a plurality of demangling operations on the received email message,
    wherein each demangling operation identifies a different type of obfuscation technique, and wherein one or more of the demangling operations modifies the received email message;
    count a number of the performed plurality of demangling operations that indicate a presence of noise in the received email message; and
    utilize the counted number of demangling operations to determine whether the email message is indicative of spam.

12. The non-transitory computer readable storage medium of claim 11 wherein the program instructions executable to perform one of the plurality of demangling operations are executable to:
    identify one or more numeric character references or character entity references in the email message; and
    responsive to identifying the one or more numeric character references or character entity references, modify at least one of the identified references.

13. The non-transitory computer readable storage medium of claim 11 wherein the program instructions executable to perform one of the plurality of demangling operations are executable to:
    identify URL password syntax data in the email message; and
    responsive to identifying the URL password syntax data, modify the identified URL password syntax data.

14. The non-transitory computer readable storage medium of claim 11 wherein the program instructions executable to perform one of the plurality of demangling operations are executable to:
    identify HTML formatting data in the email message; and
    responsive to identifying the HTML formatting data, remove the identified HTML formatting data from the email message.

15. The non-transitory computer readable storage medium of claim 11 wherein the program instructions executable to perform one of the plurality of demangling operations are executable to:
   identify noise in a header of an attachment of the email message; and
   responsive to identifying the noise in the header, remove the identified noise from the header.

16. The non-transitory computer readable storage medium of claim 15 wherein the identified noise is identified in a file extension associated with the attachment.

17. The computer system of claim 10 wherein the program instructions executable to perform one of the plurality of demangling operations are executable to:
   identify one or more numeric character references or character entity references in the email message; and
   responsive to identifying the one or more numeric character references or character entity references, modify at least one of the identified references.

18. The computer system of claim 10 wherein the program instructions executable to perform one of the plurality of demangling operations are executable to:
   identify URL password syntax data in the email message; and
   responsive to identifying the URL password syntax data, modify the identified URL password syntax data.

19. The computer system of claim 10 wherein the program instructions executable to perform one of the plurality of demangling operations are executable to:
   identify noise in a header of an attachment of the email message; and
   responsive to identifying the noise in the header, remove the identified noise from the header.

20. A non-transitory computer readable storage medium storing program instructions that are executable to:
   count a number of different obfuscation techniques present in a received email message;
   assign a first spam weight value in response to the counted number being within a first range; and
   determine whether the received email message is a spam email message, including by utilizing the first spam weight value.

21. The non-transitory computer readable storage medium of claim 20, wherein the program instructions are further executable to:
   modify the received email message to remove noise associated with one or more of the number of different obfuscation techniques counted as being present in the received email message; and
   compute a second spam weight value indicative of whether the modified email message resembles a known spam message;
   wherein the program instructions executable to determine whether the received email message is a spam email message utilize the first and second spam weight values.

22. The non-transitory computer readable storage medium of claim 21, wherein the program instructions executable to count a number of different obfuscation techniques are executable to determine whether a numeric character reference or character entity reference is present in the email message.

23. The non-transitory computer readable storage medium of claim 21, wherein the program instructions are further executable to assign a second spam weight value in response to the counted number being within a second range, and wherein determining whether the received email message is a spam email message includes utilizing the second spam weight value.

* * * * *